Jan. 13, 1953   B. L. BINFORD   2,625,042

LIQUID LEVEL RESPONSIVE MECHANISM

Filed Jan. 7, 1948

Inventor:
Benjamin L. Binford,
By Dawson, Ooms, Booth and Spangenberg,
Attorneys.

Patented Jan. 13, 1953

2,625,042

UNITED STATES PATENT OFFICE 2,625,042

LIQUID LEVEL RESPONSIVE MECHANISM

Benjamin L. Binford, Chicago, Ill., assignor to Magnetrol, Inc., Chicago, Ill., a corporation of Illinois Application January 7, 1948, Serial No. 856

8 Claims. (Cl. 73—299)

This invention relates to liquid level responsive mechanism and more particularly to a mechanism for sensing changes in the level of a liquid in a tank or the like.

One of the objects of the invention is to provide a liquid level responsive mechanism which is extremely sensitive to respond to relatively small level changes.

Another object is to provide a liquid level responsive mechanism in which there are no moving parts in mechanical engagement with each other so that the mechanism is substantially friction free.

Still another object is to provide a liquid level responsive mechanism in which changes in the liquid level produce a multiplied movement of a control part. In the preferred construction, the multiplication is produced by a manometer type device which is free of mechanical friction.

A further object is to provide a fitting which can easily be mounted on and detached from existing tanks.

The above and other objects and advantages of the invention will be more readily apparent from the following description when read in connection with the accompanying drawing, in which—

Figure 1:
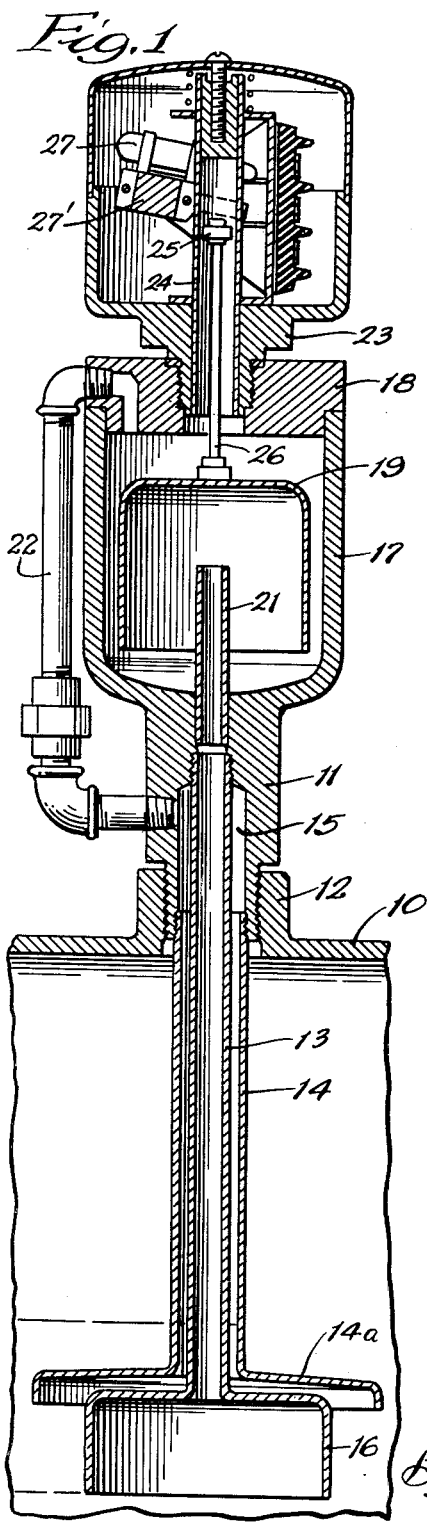
Figure 1 is a sectional view through a mechanism embodying the invention.

The mechanism, as shown, is adapted to be mounted on a tank whose top or a detachable cover on the top is indicated at 10 and which is adapted to contain a liquid whose level is to be sensed. It will be understood that the sensing of the liquid level could provide a control for the liquid entering or flowing from the tank or an indication of the level in the tank or for operation of an alarm if the level varies an undesired amount.

The mechanism comprises a hollow tubular fitting 11 which is adapted to be secured to the tank or to a removable cover on the tank as by threading it into a collar 12 on the top of the tank. The fitting carries a pair of concentric tubes 13 and 14 which are separately connected to the fitting so that they cannot communicate with each other. As shown, the outer tube 14 is threaded into the open fitting and the inner tube is threaded into the upper portion of the fitting to leave a space 15 in the fitting which communicates with the outer tube only. The inner tube projects beyond the lower end of the outer tube and preferably terminates in an enlarged pressure bell 16 which is connected at its top to the bottom of the inner tube. Use of a pressure bell is preferred since, because of its large area, it produces maximum pressure change in the tube 13 and its connected parts for a given change in liquid level although the bell may be omitted, if desired.

When a removable cover of sufficient size is provided in the top of the tank, the tubes and fitting 11 may be assembled on the cover before it is attached to the tank. When no cover is provided and the flange 12 is directly on the tank, the fitting 11 may be secured to the flange 12 and the tubes may be placed in the tank through a separate access opening and then attached to the fitting.

At its upper end, the fitting carries a hollow chamber 17 which may be formed integrally with the fitting and which is adapted to contain liquid. While any desired liquid may be employed in the chamber, it is preferred to use the same liquid as that in the tank. The chamber is closed at its top by a cover 18 to make it fluid-tight and contains a hollow float member 19 which is open at its bottom and which is preferably of such a size as to leave a relatively narrow space between the float and the chamber side wall. The interior of the float communicates with the inner tube 13 through an extension pipe 21 mounted in the fitting in alignment with the inner tube 13 and terminating in the inside of the float member. The outer tube 14 is connected to the upper part of the chamber outside of the float member by a pipe 22 communicating with the space 15 and with a bore in the cover 18.

The float is adapted to operate a mechanism for controlling or indicating the liquid level or for sounding an alarm if the level varies. As shown, the mechanism comprises a tubular plug 23 threaded into the cover 18 and carrying a non-magnetic tube 24 which is closed at its upper end. A magnetic member 25 is movable in the tube and is connected to the float by a rod 26 so that it will rise and fall with the float. A magnet 27' is pivotally mounted adjacent the tube 24 with its pole pieces lying on the opposite sides of the tube. The pole pieces are adjacent the magnetic member 25 so that as it rises and falls, the magnet will be turned about its pivot. A switch 27 carried by the magnet may be connected in a control indicating or alarm circuit.

In operation, the liquid level is normally slightly above the bottom of the pressure bell 16 and below the bottom of the tube 14. Upon a change in liquid level, for example, an increase, the liquid will rise in the bell 16 and will compress the gas trapped in the system including the bell, the inner tube 13, the pipe extension 21, and the interior of the float member. This pressure increase will force liquid out of the float member into the chamber around the float member so that it will rise. The float also tends to rise due to the pressure difference on its upper and lower surfaces caused by pressure changes in the float. Upon a predetermined movement of the float member, the switch 27 will be either opened or closed to operate the control indicating or alarm circuit.

The arrangement of the float member 19 in the chamber 17 will produce a multiplied effect such that the float will move an amount greater than the change in liquid level in the tank. The exact movement of the float will depend upon the relationship of its weight to the pressure differential across it which in turn depends on the ratio of areas of the float 19 and bell 16, as well as upon the ratio of the internal area of the float to the area between it and the chamber 17. By properly proportioning the bell, float and chamber sizes, substantially any desired multiplication of the movement can be obtained. Thus, the mechanism can be made extremely sensitive so that it will function in response to a very small change in level in the tank.

If the level should rise to a point where it closes the bottom of the outer tube 14, the entire system will be sealed and further changes in level will not affect it. To insure that changes in level above the bottom of the outer tube 14 will not affect the system, the interior area of the inner tube 13 is made equal to the area of the annular space between the inner and outer tubes. Preferably the tube 14 is provided with a bell extension 14ᵃ of such a size that the area between it and the bell 16 is equal to the area of the bell 16. Also the volume in the tube 13, float 19 and bell 16 above the lower edge of the bell 14ᵃ is made equal to the volume in bell 14ᵃ, tube 14 and chamber 17 around the float so that any temperature changes will affect both volumes equally and will not produce a false indication. Thus, the pressure differential to which the float can be subjected is limited by the vertical spacing between the inner and outer tubes or bells so that the liquid can never be blown past the float.

Similarly, conditions producing condensation in one space will produce a comparable condensation in the other space so that the float will not be moved. In addition to these desired features, the connection from the outer tube to the chamber enables accurate level response to be provided in cases where the tank is subject to pressure or vacuum. Due to this connection, the tank pressure will affect both sides of the float equally so that float movement will be solely in response to liquid level changes.

Figure 2:
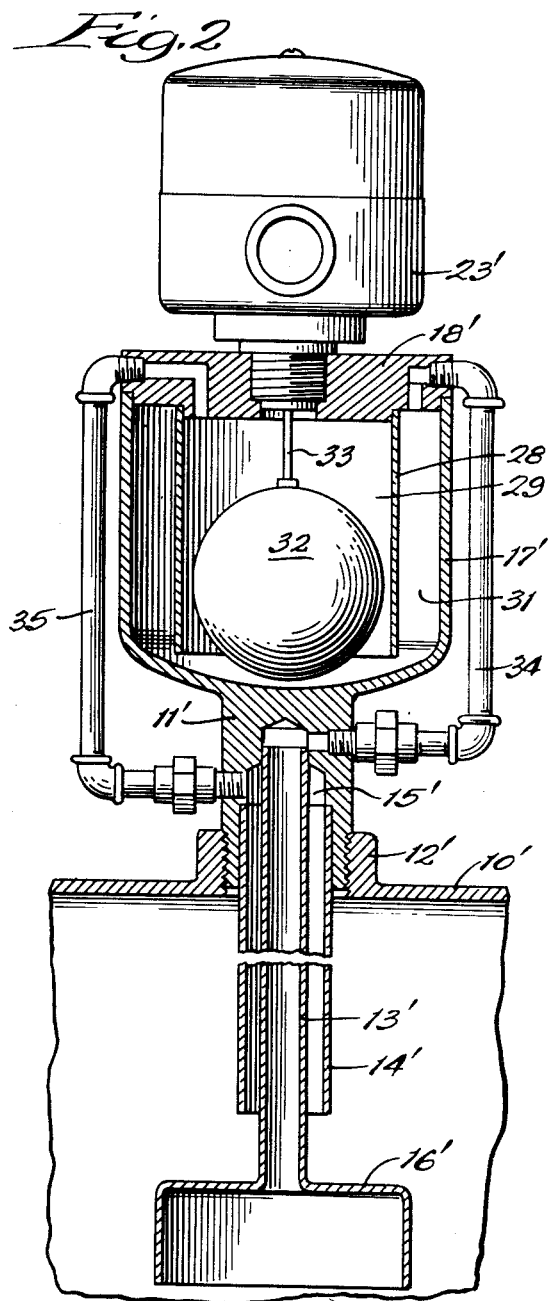
Figure 2 is a similar view with parts in elevation through an alternative mechanism.

The construction illustrated in Fig. 2 is similar to that of Fig. 1 in many respects, and parts therein corresponding to like parts in Fig. 1 have been indicated by the same reference numerals primed. In this construction, the cover 18' for the chamber 17' carries a depending annular partition 28 which divides the chamber into an inner vertical column 29 and an outer annular column 31. A float 32 is mounted in the inner column and carries a rod 33 connecting it to a control mechanism such as a magnetic member as shown at 25 in Fig. 1. The inner tube 13' communicates at its upper end with a pipe 34 which is connected to the top of the outer annular column 31, and the outer tube 14' is similarly connected through a pipe 35 to the top of the inner column 29. Thus, on a change in liquid level, the pressures acting on the columns will be changed so that liquid will flow from one column to the other to cause the float 32 either to rise or to fall. In this mechanism, the same multiplication of movement as is produced by the mechanism of Fig. 1 will not be produced but otherwise the operation is substantially identical.

While two embodiments of the invention have been shown and described in detail, it will be understood that they are illustrative only and are not intended to be a definition of the scope of the invention, reference being had for this purpose to the appended claims.

What is claimed is:

1. Liquid level responsive mechanism for use with liquid containing tanks comprising an open bottomed tube to project down into a tank and into a body of liquid in the tank whose level is to be measured, a chamber to contain liquid, means within the chamber dividing the chamber into two concentric columns communicating at the bottom, the upper end of the tube being connected in a closed system and solely to the upper part of one of the columns, a second tube projecting into the tank and opening above the bottom of the first named tube and having its upper end connected in a closed system and solely to the upper part of the other column, and means responsive to the difference in liquid level in the columns.

2. Liquid level responsive mechanism for use with liquid tanks comprising a pair of coaxial tubes of different diameters to project downward into a tank and being open at their bottoms, the inner tube terminating at a lower level than the outer tube, a manometer device including a pair of concentric vertical columns to contain liquid and communicating at the bottom, the upper ends of the tubes being connected respectively in closed systems and solely to the tops of the columns, and means responsive to the difference in liquid level in the columns, the space between the tubes having the same effective area as the inner tube.

3. Liquid level responsive mechanism for use with liquid tanks comprising a pair of coaxial tubes of different diameters to project downward into a tank and being open at their bottoms, the inner tube terminating at a lower level than the outer tube, a manometer device including a pair of concentric vertical columns to contain liquid and communicating at the bottom, the upper ends of the tubes being connected respectively in closed systems and solely to the tops of the columns, means responsive to the difference in liquid level in the columns and an enlarged pressure bell connected at its top to the bottom of the inner tube.

4. Liquid level responsive mechanism for use with liquid tanks comprising a pair of coaxial tubes of different diameters to project downward into a tank and being open at their bottoms, the inner tube terminating at a lower level than the outer tube, a chamber to contain a liquid, an open bottom float in the chamber adapted to extend below the level of said liquid, said float defining with the chamber a first column within the float and a second column around the float, and means connecting the upper end of one of the tubes in a closed system with the upper part of the first column and the upper end of the other tube in a closed system with the upper part of the second column.

5. Liquid level responsive mechanism for use with liquid tanks comprising a pair of coaxial tubes of different diameters to project downward into a tank and being open at their bottoms, the inner tube terminating at a lower level than the outer tube, a chamber to contain a liquid, an open bottom float in the chamber adapted to extend below the level of said liquid, said float defining with the chamber a first column within the float and a second column around the float, means connecting the upper end of one of the tubes in a closed system with the upper part of the first column and the upper end of the other tube in a closed system with the upper part of the second column, and an enlarged pressure bell connected at its top to the bottom of the inner tube.

6. Liquid level responsive mechanism for use with liquid tanks comprising a pair of coaxial tubes of different diameters to project downward into a tank and being open at their bottoms, the inner tube terminating at a lower level than the outer tube, a chamber to contain a liquid, an open bottom float in the chamber adapted to extend below the level of said liquid, said float defining with the chamber a first column within the float and a second column around the float, means connecting the upper end of one of the tubes in a closed system with the upper part of the first column and the upper end of the other tube in a closed system with the upper part of the second column, a vertically extending tube connected to the top of the second column, a magnetic member in the last named tube connected to the float to be moved thereby, and a magnet mounted adjacent the tube to move in response to movement of the magnetic member.

7. Liquid level responsive mechanism for use with liquid tanks comprising a pair of coaxial tubes of different diameters to project downward into a tank and being open at their bottoms, the inner tube terminating at a lower level than the outer tube, a chamber to contain a liquid, an annular downwardly projecting partition in the chamber dividing it into inner and outer columns, said partition adapted to extend below the level of said liquid, a float in the inner column, and connections from the tubes to the tops of the columns respectively.

8. Liquid level responsive mechanism for use with liquid tanks comprising a pair of coaxial tubes of different diameters to project downward into a tank and being open at their bottoms, the inner tube terminating at a lower level than the outer tube, a chamber to contain a liquid, an annular downwardly projecting partition in the chamber dividing it into inner and outer columns, said partition adapted to extend below the level of said liquid, a float in the inner column, connections from the tubes to the tops of the columns respectively, and an enlarged pressure bell connected at its top to the bottom of the inner tube.

BENJAMIN L. BINFORD.

REFERENCES CITED

The following references are of record in the file of this patent:

UNITED STATES PATENTS

| Number | Name | Date |
|---|---|---|
| 1,174,787 | Wilkinson | Mar. 7, 1916 |
| 1,363,139 | Mason | Dec. 21, 1920 |
| 1,396,273 | Miller et al. | Nov. 8, 1921 |
| 1,656,068 | Kamerman | Jan. 10, 1928 |
| 1,765,008 | Eynon | June 17, 1930 |
| 1,892,468 | Ledoux | Dec. 27, 1932 |
| 2,072,220 | Sandison | Mar. 2, 1937 |
| 2,203,523 | Cunningham | June 4, 1940 |

FOREIGN PATENTS

| Number | Country | Date |
|---|---|---|
| 182,602 | Germany | Mar. 19, 1907 |
| 293,447 | Germany | Aug. 12, 1916 |